Patented Dec. 16, 1947

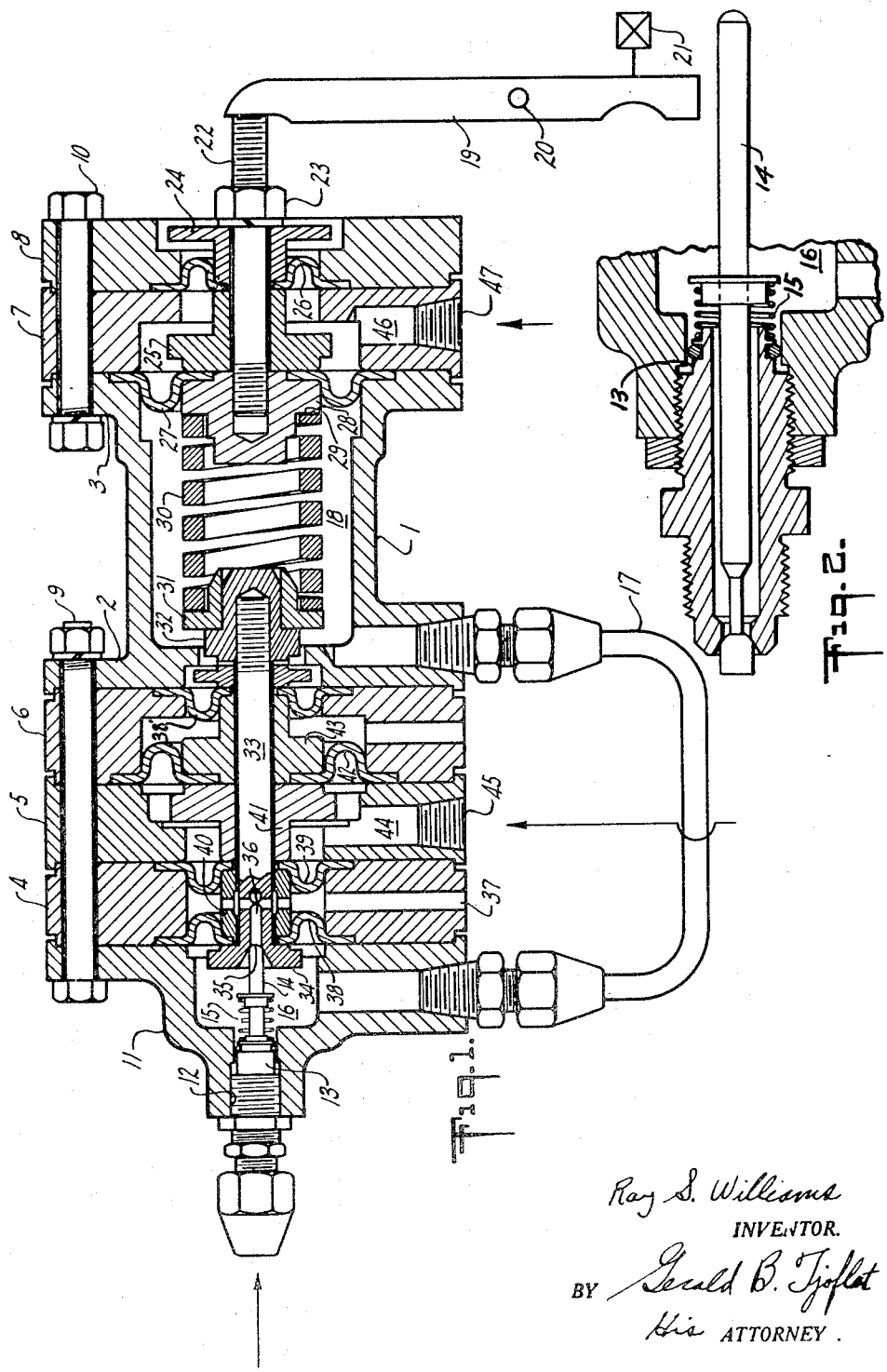

2,432,705

UNITED STATES PATENT OFFICE 2,432,705

POWER UNIT

Ray S. Williams, Orrville, Ohio, assignor to John M. Hopwood, Mount Lebanon, Pa.

Application May 30, 1944, Serial No. 538,097

3 Claims. (Cl. 121—41)

This invention relates to diaphragm power units operative in response to varying pressures of a loading line having a relatively short stroke for use as valve regulators.

It is among the objects of the invention to provide a diaphragm power unit in which the reaction of balancing pressure on the loading pressure is cancelled out without the use of stuffing boxes or bellows seals and the like.

Another object of the invention is the provision of a diaphragm type valve regulator which is extremely sensitive in its operation in response to slight variations of the loading pressure.

These and other objects of the invention will become more apparent from a consideration of the accompanying drawing constituting a part hereof in which Fig. 1 is a cross-sectional view taken centrally of a diaphragm power unit; and Fig. 2 a cross-section of an enlarged detail of a valve of said unit, which comprises a housing 1 having flanges 2 and 3 to which are attached sectional members 4, 5, and 6 at one end and 7 and 8 at the other end, secured by through bolts 9 and 10 respectively. A cap 11 is provided with a threaded opening 12 for receiving a valve 13, shown in the enlarged view, Fig. 2, controlling the application of a source of constant pressure indicated by the arrow, valve 13 having a valve stem 14 biased by a coil spring 15 to the closed position, and which when open directs the flow of the constant fluid pressure from the source to the chamber designated by the numeral 16. Chamber 16 is connected by a conduit 17 to chamber 18 so that the pressures in chambers 16 and 18 are always equal.

Numeral 19 designates a lever fulcrumed at 20 for regulating a valve designated by the numeral 21. Lever 19 is actuated by the diaphragm operator which it abuts at 22 and which has a relatively short stroke limited by the capacity for movement of its connecting diaphragms. The operator comprises a bolt secured by a nut 23 to a collar 24 which coacts with a flanged collar 25 to clamp a diaphragm 26 therebetween, the flange of the collar 25 also engaging a diaphragm 27 which is clamped to a nut 28 in which bolt 22 is threaded. Nut 28 is provided with a shoulder 29 for seating a coil spring 30, one end of which engages a spring seat 31 disposed around a nut 32 threaded into bolt 33, which is provided with a flange 34 having a valve seat 35 that constitutes the mouth of a vent passage 36 leading to the vent 37 between diaphragms 38 and 39 that are secured by a collar 40 and a collar 41. A diaphragm 38' is provided as a flexible seal for bolt or rod 33 where it projects into chamber 18. An operating diaphragm 42 is disposed between the collar 41 and a collar 43, all of which are clamped by the nut 32 on the valve bolt 33. The space between diaphragms 39 and 42 forms a part of a chamber 44. Chamber 44 has a threaded connection 45 with a conduit leading to a source of loading pressure. The space between diaphragms 26 and 27 forms part of a chamber 46. Chamber 46 has an opening 47 to which a source of supply of constant line pressure (not shown) may be connected. As may be seen by inspection of Fig. 1, diaphragms 38, 39, 38', and 26 are shown as being of the same size, and that diaphragms 27 and 42 are substantially equal in size. It will also be observed that since diaphragms 38 and 38' are of the same size and always subjected to the same value of pressure, the forces developed by the pressure acting on them will be equal and opposite. Since diaphragm 42 is larger than diaphragm 39, the effective net area of these two diaphragms from the standpoint of the pressure in chamber 44 acting on them is the difference between the effective areas of the larger diaphragm 42 and the smaller diaphragm 39. The net force developed by the pressure in chamber 44 and acting on diaphragms 39 and 42 will be the product of the pressure and the effective net areas thereof, and the force developed will act towards the right, that is towards spring 30. Likewise, the net force developed by the pressure in chamber 46 acting on diaphragms 26 and 27, will be the product of the pressure and the difference between the effective areas of the larger and smaller diaphragms 27 and 26. This force will act towards the left or towards spring 30. The force required to actuate lever 19 is the force developed by the pressure in chamber 18 acting on the effective area of diaphragm 27 minus the net opposing force developed by the pressure in chamber 46 acting on diaphragms 27 and 26.

It will also be observed by inspection of Fig. 1 that the vent 36 and the inlet port of valve 13 will be closed when the net operating force developed by the pressure in chamber 44 on diaphragms 39 and 42 is in balance with the opposing force exerted by spring 30.

The operation of the diaphragm operator is as follows: With a constant line pressure in chamber 46 tending to compress spring 30, the valve seat 35 is urged against the end of the valve stem 14, closing vent 36 and maintaining equal pressures in chambers 16 and 18 which balances the pressure on the diaphragm 27 and prevents movement of the valve regulator arm 19. When the loading pressure in chamber 44 varies as by increasing pressure on diaphragm 42, this causes movement of the diaphragm operator in the direction of the valve regulator arm 19 which opens vent 36 by unseating valve stem 14 and allows the pressure in chamber 16 to vent through passage 37 to the atmosphere. The loading conduit 17 being connected to chamber 18 will similarly vent the latter, causing diaphragm 27 to act against spring 30 to restore valve seat 35 to the position of contact with valve stem 14, thereby closing vent 36. Movement of the operator to the vent closing position will depress valve stem 14 and open valve 13 to admit the constant pressure fluid into chamber 16 which through the loading conduit 17 is transmitted to chamber 18, thereby restoring the diaphragm operator to its normal position, in which position valve stem 14 is again seated in the vent opening 35 and the air supply valve 13 is closed.

Since there are no packing glands for the moving parts of the diaphragm operator there is no friction and the device is extremely sensitive to slight variations between pressures in the loading line 45 and the constant line pressure in line 47, rendering the device instantly responsive to any pressure changes, and restoring balance without lag. Such a device is especially adapted for sensitive regulation of fuel or air control valves for furnaces and the like.

Although one embodiment of the invention has been illustrated and described, it will be evident to those skilled in the art that various modifications may be made in the details of construction without departing from the principles herein set forth.

I claim:

1. A diaphragm power unit comprising a sectional housing having a central chamber, an operator disposed in said chamber having a plurality of diaphragms extending radially to the wall of said chamber, dividing the same into a plurality of pressure chambers, a source of constant pressure fluid for the end chambers, a source of variable loading pressure for an intermediate chamber, a loading conduit connecting one of the end chambers with another intermediate chamber, a valve operable in response to movement of said operator for venting said conduit-connected chambers and for supplying pressure fluid to said chambers to balance out the pressure in the other of said end chambers.

2. A diaphragm power unit comprising a sectional housing having a central chamber, a jointed operator disposed in said chamber comprising a plurality of threaded rods having a resilient connection therebetween and having a plurality of diaphragms mounted thereon and secured to the inner wall of said housing, dividing the housing into a plurality of pressure chambers, a source of constant pressure fluid for the end chambers, a source of variable loading pressure for an intermediate chamber, a loading conduit connecting one of the end chambers with another intermediate chamber, a valve operable in response to movement of said operator for venting said conduit-connected chambers and for supplying pressure fluid to said chambers to balance out the pressure in the other of said end chambers.

3. A diaphragm power unit comprising a sectional housing having a central chamber, a jointed operator disposed in said chamber comprising a plurality of threaded rods having a resilient connection therebetween and having a plurality of diaphragms mounted thereon and secured to the inner wall of said housing, dividing the housing into a plurality of pressure chambers, one of said rods having a passage at one end for venting the end pressure chamber, a valve controlling said vent passage having connection with a source of constant pressure and being normally biased to close said vent passage, a loading conduit connecting said end chamber with a chamber intermediate said rods, a source of constant pressure for the other of said end chambers and a source of variable loading pressure for another intermediate chamber for subjecting said rods to movement against the resistance of the resilient connection therebetween, the movement of the rod having the vent passage operating the valve in the end chamber to vent said chamber and the intermediate chamber connected by the loading conduit and to open the valve in said end chamber to admit fluid pressure into said chamber and to said intermediate chamber to counteract the pressure in the other of said end chambers.

RAY S. WILLIAMS.

REFERENCES CITED

The following references are of record in the file of this patent:

UNITED STATES PATENTS

| Number | Name | Date |
|---|---|---|
| 2,219,062 | Almond | Oct. 22, 1940 |
| 2,304,782 | Donaldson | Dec. 15, 1942 |
| 2,350,615 | Joesting | June 6, 1944 |
| 971,207 | Michel | Sept. 27, 1910 |

FOREIGN PATENTS

| Number | Country | Date |
|---|---|---|
| 476,341 | Great Britain | Dec. 11, 1937 |
| 544,753 | Great Britain | Apr. 27, 1942 |